June 19, 1928. Re. 17,004

G. H. BLAKELEY

H BEAM

Original Filed Dec. 20, 1921

INVENTOR

G. H. Blakeley.

BY

R. S. C. Vaughan

ATTORNEY

Reissued June 19, 1928. Re. 17,004

UNITED STATES PATENT OFFICE.

GEORGE H. BLAKELEY, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

H BEAM.

Original No. 1,658,831, dated February 14, 1928, Serial No. 523,763, filed December 20, 1921. Application for reissue filed March 19, 1928. Serial No. 262,861.

The present invention relates to H-beams and more particularly to a series of such beam of greater dimensions than heretofore manufactured.

The largest H-beams produced prior to the present invention had a height of a little less than 17″ and a breadth of a little less than 15″; the breadth being measured parallel with the flanges and the height parallel with the web. The present invention comprehends a series of H-beams, each of which has both a greater height and width than the present beams. In other words, the beams of the series have a greater height than 17″ and a breadth of more than 15″.

Figure 1:
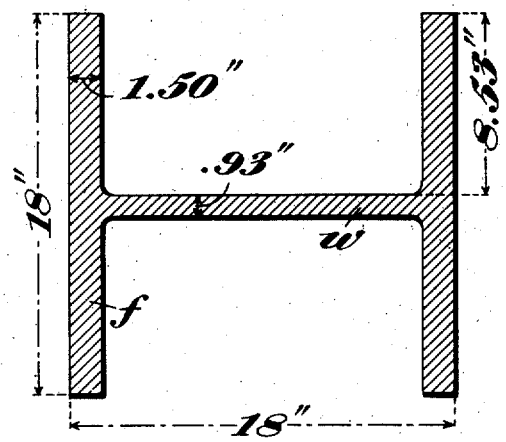
Figure 2:
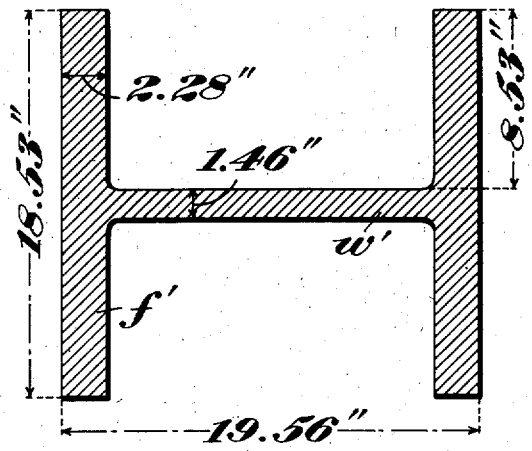
Figure 3:
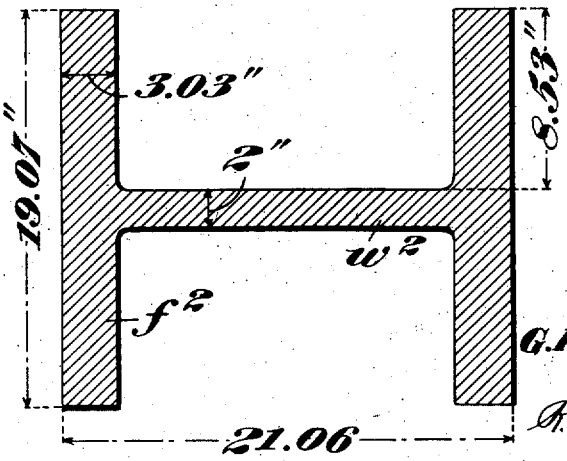

The objects and features of novelty will be apparent from the description taken in connection with the drawings, in which Figures 1 to 3 inclusive illustrate a series of H-beams in cross-section, embodying the present invention.

Referring to the drawings it will be noted that the smallest beam of the series, that is the beam illustrated in Fig. 1 has a height of more than 17″ and a breadth of more than 15″. As shown the height is 18″ and the breadth 18″. The thickness of the web $w$ is .93 and the thickness of the flanges $f$ is 1.50. The length of each of the flanges is 8.53.

The beam shown in Fig. 2 is somewhat heavier. Thus the height is 19.56″ and the breadth 18.53″. The thickness of the web $w$ is 1.46 and the thickness of the flanges $f'$ is 2.28. It will be noted that the flanges are 8.53″ long, that is they are the same length as the beam of Fig. 1.

Fig. 3 shows the heaviest beam of the series which has a height of 21.06″ and a breadth of 19.07″. The thickness of the web $w^2$ is 2.00″ and the thickness of the flanges $f^2$ is 3.03″. The length of the flange is the same as in the other members of the series, that is, 8.53″.

Heretofore in a series of H-beams as rolled by standard mills, the height has remained constant and variation in weight obtained by adjusting the rolls to and from each other. Because of the requirements of manufacture therefore, in the heavier beams of a series, a relatively greater amount of weight is added to the webs than to the flanges. For the most efficient disposition of the metal, the flanges of the heavier beams should increase in weight at least in the same proportion as the web. This desirable result is obtained in the series of the present invention by rolling the beams in a Grey or Universal mill. This type of mill has both horizontal and vertical rolls, the horizontal rolls forming the web and the vertical rolls engaging the outside of the flanges of the beams being rolled. With this type of mill it is possible to produce a series of beams, in which, when comparing one beam with another the increase in the weight of the flanges is in the same proportion as the increase in the weight of the web.

Furthermore, in the larger sized H-beams as heretofore rolled, there has been a relatively large number of defective beams produced, because of buckling and distortion of the flanges and webs. If the flanges, for example, in the rolling, are elongated more than the web, distortion and buckling occur, especially when both the flanges and web have relatively great dimensions. Obviously it is much easier to cause buckling and distortion in H-beams having long flanges and high webs than in such beams having these parts of small dimensions. Because of the relatively high percentage of defective beams that occurs when the webs and flanges are of relatively great dimension, about the limit that it has been possible to manufacture heretofore is an H-beam having a height of a little less than 17″ and a breadth of a little less than 15″.

I have discovered however that it is possible to obtain larger H-beams and have no greater percentage of defective ones than with the small size beams. It is absolutely necessary however, in order to obtain these large beams, that the ratio of flange area to web area be maintained substantially constant in the several passes of the beam through the mill, and equal to the value of this ratio in the finished beam. This condition, it will be noted, is fulfilled in the present series. Thus the area of a pair of oppositely projecting flanges of the beam shown in Fig. 1 is 27 square inches. The area of the web is 13.95 square inches. Hence the value of the ratio flange area to web area is 1.93.

In a similar manner the area of a pair of oppositely projecting flanges of the beam shown in Fig. 2 is 42.25 square inches. The area of the web is 21.90 square inches. The value of the ratio flange area to web area is therefore 1.93.

In the beam illustrated in Fig. 3 the area of a pair of oppositely projecting flanges is 57.78 square inches. The area of the web is 30.00 square inches. Hence, the ratio flange area to web area is 1.93.

It is seen therefore that in each of the beams of the present series the ratio flange area to web area is practically constant and in this particular instance has a value of approximately 1.93. While there is a slight variation in the ratio of the flange area to web area it is apparent that the differences are practically negligible, being such as would be unavoidable in any practical rolling.

Another feature of the present invention resides in the fact that the lengths of the flange legs in each beam of the series are the same. That is to say, the length of the flange legs of the smallest beam of a series is the same as the length of the flange legs of a large beam of the series. In this particular example the length of each flange leg is 8.53″.

It is to be understood that a series of beams such as disclosed herein is rolled by a single mill. Thus, starting with the ingot, the same is formed into a "bloomer" in the blooming mill.

Then this bloomer is reduced by being passed several times through each of the stands of the mill. If a satisfactory beam, as regards dimensions, is obtained when the blank has been reduced to the dimensions of Fig. 3, for instance, then no further reduction is necessary. On the other hand, if the blank at this stage is not of the desired size, it is further reduced until another beam of the series is obtained. In other words, the beams of the present series correspond with the blank at different stages in its reduction in the mill.

Having described my invention, what I claim as new and desire to secure by Letters Patent is:

1. As a new article of manufacture a solid rolled H-beam substantially free from distortion, not less than 17 inches in height, having a width not less than 15 inches, and in which the ratio of the area of the flange portion to the area of the web portion is not less than 1.93.

2. As a new article of manufacture a solid rolled H-beam, substantially free from distortion, not less than 17 inches in height, having a width substantially in excess of 15 inches, the ratio of the area of the flange portion to the area of the web portion not being less than 1.93.

GEORGE H. BLAKELEY.